United States Patent [19]

Cantini

[11] 4,077,099
[45] Mar. 7, 1978

[54] MACHINE FOR THE PRODUCTION OF HELICAL SPRINGS AND FOR THEIR INTRODUCTION INTO HOLLOW ANNULAR SAFETY CATCHES FOR NECKLACES

[76] Inventor: Alfredo Cantini, P.za Giotto 20, Arezzo, Italy, 52100

[21] Appl. No.: 730,617

[22] Filed: Oct. 7, 1976

[51] Int. Cl.$^2$ .............................................. B23P 23/00
[52] U.S. Cl. .................................. 29/38 C; 29/160.6; 29/705
[58] Field of Search ................. 29/38 C, 564.2, 160.6, 29/452, 705

[56] References Cited

U.S. PATENT DOCUMENTS

| | | | |
|---|---|---|---|
| 1,423,441 | 7/1922 | Lemaitre | 29/160.6 X |
| 1,856,952 | 5/1932 | Foerster | 29/160.6 |
| 3,825,988 | 7/1974 | Hardick et al. | 29/564.2 |

*Primary Examiner*—J. M. Meister

[57] ABSTRACT

Apparatus for inserting helical springs into annular safety catches including a revolving table, four pliers units positioned on the periphery of the table, a first station for feeding catches, a second station where a helical spring is inserted in a catch, a third station where the ends of the catch are brought into coplanar position, and a fourth station with a sensing head where the end product is checked with provision to separate out faulty products.

4 Claims, 3 Drawing Figures

MACHINE FOR THE PRODUCTION OF HELICAL SPRINGS AND FOR THEIR INTRODUCTION INTO HOLLOW ANNULAR SAFETY CATCHES FOR NECKLACES

The present invention relates to a machine for the construction of helical springs and for their introduction into hollow annular safety catches of "per se" well known type and which are commonly used as safety closure means for necklaces, bracelets and the like. Said machine comprises a revolving table rotating about a vertical axis and co-operating with means to cause said table to rotate, step-by-step at predetermined time intervals through an angle of 90° about said axis, said table carrying four identical pliers units, angularly spaced away from each other of an angle of 90° along the table periphery and each mounted on a support co-operating with radially directed guideways, and with a shock absorbing spring, said pliers units each having two arms placed in the same vertical plane and which are under the action of springs tending to clamp one arm against another with said revolving table being associated four work stations, each facing one of the stop positions of said pliers units, in the first of said stations an apparatus being arranged including a container for a plurality of safety catches with already inserted closure sliders, but yet lacking in their closure springs and having their ends in vertically offset relationship, said container being open at its lower part, where a slide distributor is provided adapted to push the lowermost safety catch of the column out of said container up to bring it between the open arms of the facing pliers unit, while at the second station an apparatus is provided for continuously constructing a helical spring from a continuous wire and for cutting a section therefrom of a predetermined length and for causing said section to enter into the inner annular space of said safety catch, letting in pass through that end of said catch which is opposite to that end where is placed the closure slider having an outwardly extending control prong, and for punching the wall of the safety catch to form an inner projection suited to lock an end of said spring at a predetermined distance from that end of catch through which said spring has been previously inserted, at the third station a device being provided adapted to bring the offset ends of the safety catch in a same plane, while at the fourth station a device is mounted to inspect each safety catch which arrives in said station, as well as means to separate the good pieces from the faulty ones. Hitherto the production of helical springs and their insertion into safety catches are performed according to a quite different technique. Said helical springs were constructed by an automatic machine, starting from wire lengths which had been obtained from a continuous wire, each length being separately shaped in the form of helical spring suited for it particular intended purpose, while the insertion of each spring into a safety catch was manually performed. The machine of this invention enables to carry out both said operations automatically and in a same cycle, avoiding the difficulties and slowness of the manual operations, thus reducing the time consumption and the manufacturing costs.

Other characteristics and advantages of the invention will be better understood from the following description of an embodiment of the invention taking in consideration the accompanying drawings, in which.

Figure 1:
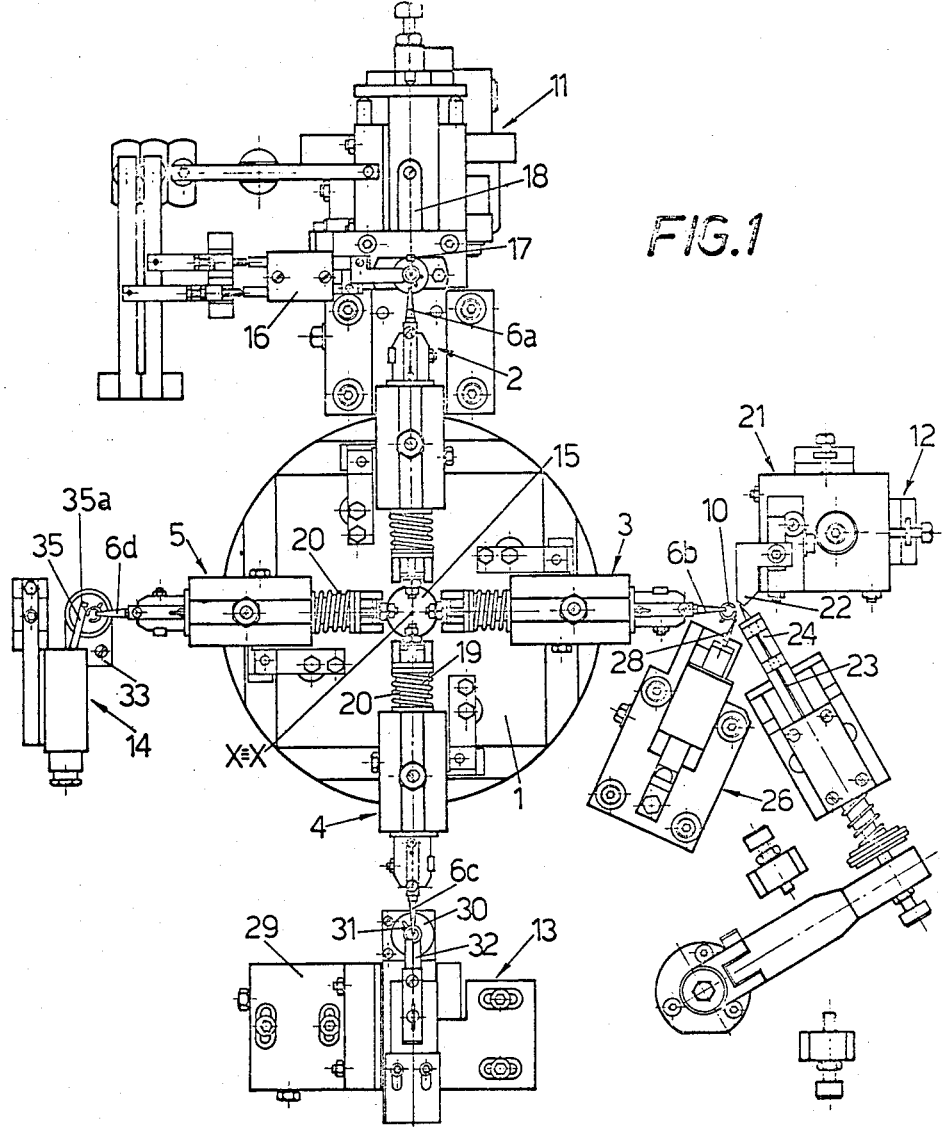
FIG. 1 is a diagrammatic top view of the machine.
Figure 3:
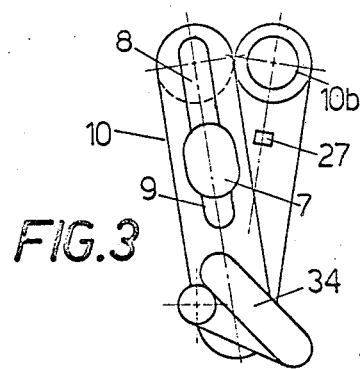

Now referring to FIG. 1, the machine comprises a revolving table, generally indicated 1 and which is pivotally mounted about a vertical axis X—X on this table 1 four identical pliers units are mounted angularly spaced away from each other of an angle of 90° and indicated 2,3,4 and 5, each unit including pliers having their arms in vertical alignment, while springs (not shown) tend to clamp said arms one against the other said pliers units being indicated 6a, 6b, 6c and 6d and extending radially outwardly beyond the periphery of the revolving table 1 so that each pair of pliers arms can grip and hold a safety catch 10. The safety catches 10 in their feed condition have offset ends, i.e. their longitudinal center line extends according to a helical form, since their ends are offset in heigth as can be seen in FIG. 3, so that the entrance orifices 10a, 10b, into the inner annular space of said catches 10 are spaced away from each other in heigth so as to be freely accessible. From the end orifice 10a can thus freely comes out the end of a closure slider 8 made integral with a gripping outwardly projecting control tooth or prong 7 which extends out of the wall of the safety catch 10 passing through a longitudinal slot 9. Each of the pliers units 6a,6b,6c and 6d mounted on the revolving table 1 receives, holds and transfers in turn one safety catch 10 starting from the feeding station 11 to the subsequent work stations 12,13 and 14 arranged in those positions where the stop the pliers units 6a to 6d of the revolving table 1 said revolving table 1 being driven by means (not shown) causing said revolving table 1 to pivot about the axis X—X of its supporting shaft through angles of 90° said rotary movements being performed at predetermined time intervals separated by rest time intervals of predetermined duration. The operative cycle begins at the station 11, in which in the shown condition is placed the pliers unit 6a, each pliers unit being mounted on a slider 19 reciprocating along radial guideways and which is pushed outwardly by a compression helical spring 20. At the station 11 is provided an automatic charging unit 16 of a known type and comprising a tubular container 18 having a vertical axis and designed to contain a plurality of safety catches 10 arranged in column and in horizontal position with a predetermined orientation of their gripping prongs 7. The container in the unit 18 has orifices near its bottom through which can enter the blade head 17 of a sliding arm which becomes operative and can moves radially towards the facing pliers unit 6a as soon as this latter arrives and stops in the front of the station 11, thus forcing the lowermost safety catch 10 of the column to come out of said container up to be positioned between the open spring arms of said pliers 6a in a predetermined position of said safety catch 10 i.e. in such a position that the pliers arms can grip said safety catch 10 substantially near the half of its length; at the same time the pliers unit 6b which has received a safety catch 10 during the first phase of the preceding cycle, reaches the station 12 while the pliers unit 6c reaches the station 13 and the pliers unit 6d the station 14. Starting from the position of the parts, as shown in FIG. 1, the revolving table 1 is caused to pivot in the clockwise direction through an angle of 90° so that the pliers unit 6a will takes the position of the pliers unit 6b and this latter the position of the pliers unit 6c and so on, each of the pliers units in combination with the associated work station 5 performing an operative cycle displaced of one phase in regard to the cycle carried out by the preceding pliers unit.

The pliers unit 6a which holds the safety catch 10 arrives in the front of the station 12 from which extends outwardly an arm 22 having a head so shaped as to form an abutting surface for the end 10b of the catch 10; through said end 10b the helical spring section 25 will be introduced into the catch 10 by help of a rotary pin 23 sliding along a chute 24 and which is designed to take guide and push forwards one of the spring sections 25 which have been obtained into a superposed unit which is per se well known and which therefore has been not shown in detail up to introduce it into the tubular inner space of the safety catch said spring being subsequently locked in the inside of said safety catch at one of its ends by means of the slider 8 and at the other end by an inner projection 27 obtained in the wall of the catch 10 by means of a punching operation performed by a pin 28 and which takes place subsequently to the movement of the pin 23 performing the introduction of the spring 25 said projection 27 being spaced away from the end 10b enough to permit that the head of the slider 8 can enter and be locked into the orifice 10b in the closure condition of the safety catch 10 which is provided with a small link 34 to allow said catch 10 to be connected to a necklace, bracelet or the like. The pin 28 can freely come into contact with the outer wall of the inner annular space encircled by the catch 10 near the end 10b owing to the fact that the ends of said catch 10 are offset one with respect to the other when the catches 10 are fed in the station 11.

Figure 2:
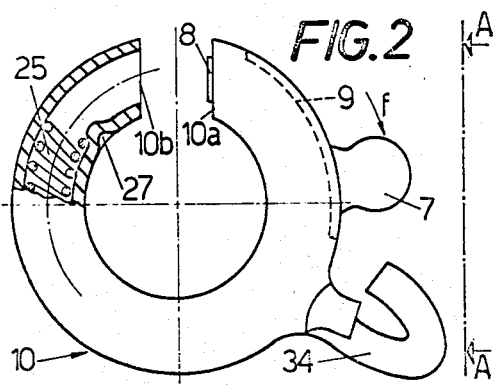
FIGS. 2 and 3 show a safety catch after the insertion of the spring in a plan view and in a side view taken from the line A—A of FIG. 2, respectively.

In FIG. 1 the pliers unit 6b and safety catch 10 is shown in the position which it attain just before an inner cam of the revolving table causes the pliers unit 6b to move in order to put the catch 10 in such a position as to enable the devices 23 and 28 can act on it. At the station 13 a device 29 is placed which includes a horizontal disc 30 actuated by means adapted to cause said disc 30 to pivot about a vertical axis said disc 30 having a tooth 31 extending upwardly and so positioned that if the disc 30 rotates in clockwise direction, said tooth 31 can come into contact with the projecting tooth 7, forcing this latter to move backwardly against the action of the inner spring 25, as shown by the arrow f in FIG. 2 so as to cause the slider 8 to go back into the catch 10; then the two arms of the pliers 32 will become operative arms which are designed to bring the ends 10a and 10b of the safety catch 10 in their coplanar position so that as the disc 30 will pivot then in opposite direction and when the safety catch 10 leaves the station 13 the slider 8 of the safety 10 can correctly enter the facing end orifice 10b under the effect of the spring 25, taking the position in which it can act as a safety closure means for the necklace or the like. At the station 14 an apparatus 33 is arranged provided with a movable arm 35 shaped as a blade and including a sensing head 35a for controlling the perfect planarity of the longitudinal center line of the finished safety catch 10 and the correct alignment of its ends 10a, 10b, said sensing head 35a of the arm 35 giving signals enabling to detect the defective pieces among the good pieces said defective pieces being discharged at the end of the operative cycle performed by the pliers unit 6a and so on.

What we claim is:

1. A machine for the construction of helical springs and for their insertion into annular hollow safety catches for necklaces, bracelets and the like, comprising a revolving table pivotally mounted about a vertical axis (X—X) and associated with means adapted to let said revolving table pivot at predetermined time intervals through an angle of 90° about said axis, four indentical pliers units angularly spaced away from each other by an angle of 90° along the periphery of said revolving table, said pliers units being supported by supports cooperating with radial guideways and with springs adapted to push said supports outwardly until said pliers units extend beyond the periphery of said revolving table, each of the pliers units having gripping arms in vertical superposed relationship which are forced to approach and to clamp one against the other under the action of springs; and four work station each placed in the front of one of the stop positions of said pliers units, the first station including a container in which are inserted in column a plurality of safety catches provided with a slider but yet lacking in springs and which have vertically offset ends, said container including a lower slide device adapted to push outwardly the lowermost catch of the column into the open arms of the facing pliers unit, the second station comprising means constituting an abutting surface for the outermost portion of said catch, as well as an apparatus for the construction of a continuous a helical spring from a continuous wire and which cooperates with a cutting device to cut a length of a predetermined value of said spring, and means for pushing said spring length through the end orifice of said catch which is opposite to that where the slider has been mounted which has an outwardly projecting control prong and a means adapted to obtain a projection into the inner surface of the annular catch to lock one end of the spring at a predetermined distance from the entrance orifice of said spring, the third station comprising means to move said slider backwardly so as to force said slider to come back into the catch inner cavity against the action of the inner spring and a pliers device to bring into register the vertically offset ends of said safety catch, the fourth station comprising means to control the planarity of the safety catch as well as means to provide signals under the control of a sensing head to separate the good pieces from the faulty ones.

2. A machine according to claim 1, wherein the first station container comprises a vertical container so shaped as to contain the safety catches in a vertical column and in a predetermined identical disposition near its bottom, said container having two aligned passage orifices being arranged in alignment with the pliers unit stopping in this station, said lower slide device comprising a blade being reciprocable to and from the facing and aligned pliers unit.

3. A machine according to claim 1, wherein the second station includes an arm so shaped as to support the side of the safety catch during the insertion and the locking of the helical spring, a pin cooperating with a chute and controlled by means causing the reciprocation of said pin to and from the facing catch in order to introduce the spring length into the inner tubular cavity of said safety catch, and a cam mounted on the shaft of the revolving table to move outwardly the support of the pliers carrying said catch.

4. A machine according to claim 1, wherein the third station means to move said slider comprises a horizontal revolving disc from which a tooth extends upwardly and which is so positioned to come into contact during its rotary movement with the control prong of the slider of the catch carried by the pliers so as to move back said control prong until said slide entirely enters back into the inner cavity of the catch, and said pliers device comprising a pair of reciprocating arms adapted to let the offset ends of the catch become again coplanar so as to restore the planarity of the longitudinal center line of said safety catch.

* * * * *